Nov. 21, 1967     J. M. GREEN ET AL     3,354,390
SIGNAL COMPARATOR USING CAPACITOR CHARGE AND DISCHARGE RATES
Filed June 3, 1963
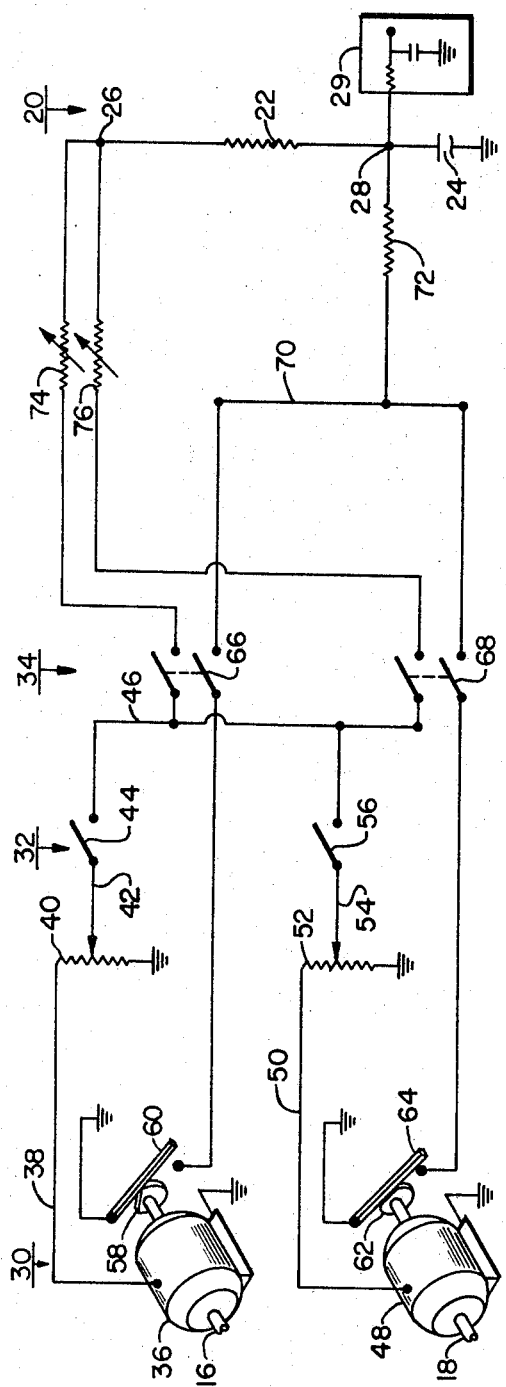
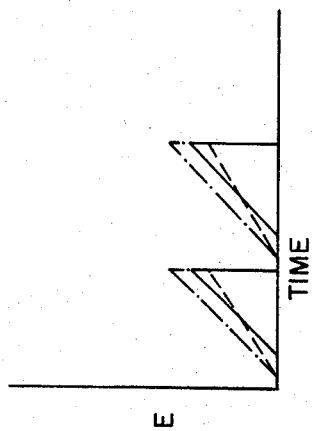
FIG. 3
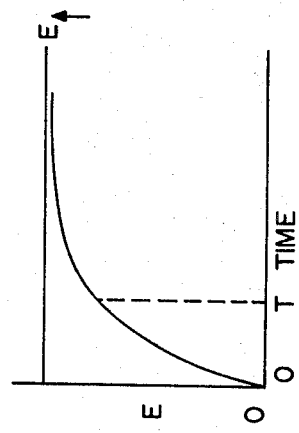
FIG. 2
INVENTORS
JOHN M. GREEN
PERRY F. McKINNEY
*Kelly O. Corley*
ATTORNEY

United States Patent Office 3,354,390
Patented Nov. 21, 1967

3,354,390
SIGNAL COMPARATOR USING CAPACITOR CHARGE AND DISCHARGE RATES
John M. Green, Pensacola, and Perry F. McKinney, Milton, Fla., assignors to Monsanto Company, St. Louis, Mo., a corporation of Delaware
Filed June 3, 1963, Ser. No. 284,866
8 Claims. (Cl. 324—79)

ABSTRACT OF THE DISCLOSURE

A capacitor is charged at a rate proportional to a first or numerator quantity, and periodically rapidly discharged at a repetition rate proportional to a second or denominator quantity. The average and the peak voltages across the capacitor correspond to the quotient of the two quantities.

---

The present invention concerns an apparatus for continuously measuring and analyzing relationships between two or more quantities. More particularly, the invention concerns such apparatus wherein an electrical signal is applied to charge a capacitor according to a first input quantity, while the capacitor is periodically discharged in accordance with another quantity being measured, whereby the average charge on the condsenser is proportional to the desired relationship.

There are many applications for apparatus which are capable of determining the ratio between given quantities. Existing approaches to the solution of this problem are typically cumbersome and complex, usually involving elaborate and expensive circuitry.

Accordingly, a primary object of the invention is to provide apparatus for accurately determining the ratio of a selected quantity to a selected second quantity.

A further object is to provide simple circuitry for compensating for differences between individual transducers.

A further object is to provide simple circuitry for compensating for different dwell times among switching mechanisms.

A further object is to provide apparatus for accomplishing the above objects in a simple, economical and reliable manner.

Other objects of the invention will in part be obvious and will in part appear hereinafter.

The invention accordingly comprises the features of construction, combination of elements, and arrangement of parts which will be exemplified in the construction hereinafter set forth, and the scope of the invention will be indicated in the claims.

For a more complete understanding of the nature and objects of the invention, reference should be made to the following detailed description taken in connection with the accompanying drawing, in which:

FIGURE 1 is a schematic circuit diagram illustrating the basic principles of the invention;

FIGURE 2 is a graph illustrating the voltage in an RC network as a function of time; and FIGURE 3 is a graph of voltage against time at the output terminal of the FIGURE 1 circuit, demonstrating the mode of operation.

Referring now generally to FIGURE 1 there is schematically shown an exemplary system for determining the ratio of a first type of signal in the form of a DC voltage to a second type of signal in the form of a switching action of a variable rate. For illustrative purposes the input signals are here disclosed as derived from mechanical motions, i.e., the angular velocity of rotating shafts 16 and 18. It should be understood that electrical signals of the appropriate character from any source may be analyzed without necessarily involving electromechanical transducers. It is assumed that it is desired to determine the ratio of the angular velocity of shaft 16 to that of shaft 18 or vice versa.

A series analyzing RC circuit 20 including a resistor 22 and a capacitor 24 is connected between an input terminal 26 and a point of reference potential. If a DC signal X proportional to a quantity selected as the numerator of the desired ratio is applied to input terminal 26, capacitor 24 will charge according to the formula $E = X$ $$\left(1 - e^{\frac{-T}{RC}}\right)$$

where T is the time elapsed after application of the voltage X, so that the voltage E appearing between the output terminal 28 and ground varies with time as shown in FIGURE 2. Note that when T is near zero the charging curve is a substantially linear function of time. If capacitor 24 is discharged at a repetition rate proportional to a quantity Y selected as the denominator of the desired ratio, the average potential at terminal 28 will correspond to $X/Y$ if the repetition rate is high enough to restrict the voltage E to the linear region of the FIGURE 2 curve. A suitable measuring circuit or other load 29 may be connected to terminal 28, and may include integrating or filtering circuitry if desired.

The above operation is achieved by the exemplary FIGURE 1 circuit as will be more clearly explained. Referring now more specifically to FIGURE 1, the system includes in addition to circuit 20, a signal generator section 30 for producing the appropriate numerator and denominator signals, and a switching section including a series 32 of numerator selector switches and a series 34 of denominator selector switches.

Signal generator section 30 includes a DC generator 36 driven by shaft 16, producing a DC output signal on terminal 38 proportional to the angular velocity of shaft 16. A potentiometer resistor 40 connects terminal 38 to a point of reference potential, and tap 42 on resistor 40 is connected through numerator selector switch 44 to a numerator conductor 46. Similarly DC generator 48 is driven by shaft 18 to produce a DC output signal on terminal 50 proportional to the angular velocity of shaft 18. A potentiometer resistor 52 connects treminal 50 to the point of reference potential, and includes a tap 54 connected through a numerator selector switch 56 to the numerator conductor 46. Accordingly, closure of one of the numerator selector switches 44 and 56 produces on numerator conductor 46 a DC signal proportional to the angular velocity of the corresponding shaft 16 or 18. This selected numerator signal is applied to terminal 26 through one of the denominator selector switches as will be explained below. Taps 42 and 54 permit equalization of the signal applied to numerator conductor 46 by the respective generators 36 and 48, and thus provide compensation for differences among the generators.

The switching signal for discharging capacitor 24 may be produced, as illustrated, by a cam actuated switching arrangement. Thus a cam 58 on shaft 16 actuates switch 60 at a repetition rate proportional to the angular velocity of shaft 16, and a similar cam 62 actuates switch 64 at a repetition rate proportional to the angular velocity of shaft 18. A first terminal of each of switches 60 and 64 is connected to the point of reference potential. The remaining terminals of switches 60 and 64 are connected through first sets of contacts on respective denominator selector switches 66 and 68 to the denominator conductor 70. Preferably a small resistor 72 connects conductor 70 to the output conductor 28. Thus, each time the selected cam-actuated switch 60 or 64 closes, capacitor 24 is discharged. Resistor 72 lowers the discharging current level to prevent injury to the discharging mechanism, e.g., the selected switch 60 or 64.

It has been found that variations in dwell angle or duration of closure frequently occur among the switching signal generators, such as the illustrated cam-actuated switches 60 and 64. According to one aspect of the present invention, such variations are compensated for by adjustment of an appropriate trimming resistor.

Each denominator selector switch, when closed, connects numerator conductor 46 through an associated trimming resistor to the input terminal 26. Thus conductor 46 may be connected to terminal 26 through a first set of auxiliary contacts on the denominator selector switch 66 and a first trimming resistor 74, or through a set of auxiliary contacts on denominator selector switch 68 and a second trimming resistor 76.

Referring now to FIGURE 3, there is shown a graph of voltage vs. time at terminal 28 with a given D.C. signal on numerator conductor 46, for different discharging conditions. It is assumed that switch 66 is closed, and thus that the solid line represents voltage vs. time for operation of switch 60. As shown, the voltage across capacitor 24 increases while switch 60 is open, decreases rapidly to zero when switch 60 is closed, and remains at zero during the dwell time or angle until switch 60 opens again. The slope of the solid line in the interval when switch 60 is open depends on the voltage on conductor 46, the combined resistance of resistors 74 and 22, and the capacitance of capacitor 24. At a constant repetition rate of switch 60, the average potential at terminal 28 will assume some definite value.

If now switch 66 is opened and switch 68 is closed, average potential at terminal 28 will be the same when resistor 76 equals resistor 74 only if the dwell angle during which switch 64 is closed is identical to the dwell angle of switch 60, assuming that switches 64 and 60 are actuated at the same repetition rate. If, however, the dwell angle of switch 64 is less than the dwell angle of switch 60, the voltage across capacitor 24 will be as shown in the dot-and-dash line in FIGURE 3 if resistor 76 has the same value as does resistor 74, and the average potential will be greater than in the case illustrated in solid lines. The trimming resistors 74 and 76 are adjustable to compensate for differences in dwell angle of the cam-actuated switches 60 and 64, so that the average voltage produced at output terminal 28 will be identical for identical repetition rates of switches 60 and 64. Thus, resistor 76 would be increased in value in the case illustrated in dot-and-dash lines, sufficiently to lower the voltage across capacitor 24 to that shown in dotted lines. Conversely, if the dwell angle of switch 64 were greater than that of switch 60, resistor 76 would be decreased in value. After the trimming resistors have once been properly adjusted to compensate for the dwell angle of their associated discharge mechanisms at some repetition rate, no adjustment for different repetition rates is necessary.

It is particularly noted that resistor 74 is inserted in series between numerator conductor 46 and input terminal 26 by auxiliary contacts on switch 66 whenever discharge mechanism 60 is selected, regardless of which numerator selector switch is actuated, and that resistor 74 should be set at the proper value to compensate for the dwell angle of discharge mechanism 60. Likewise resistor 76 is inserted through auxiliary contacts on denominator selector switch 68 to compensate for the dwell angle of discharge mechanism 64.

As a specific example, each of generators 36 and 48 produces D.C. voltage directly proportional to the angular velocity of its associated shaft, ranging between zero and 135 volts D.C., the latter voltage being obtained at 3,000 r.p.m. of shafts 16 and 18. The switches 60 and 64 were actuated at twice the revolution rate of shafts 16 and 18, i.e., up to 6,000 actuations per minute. The potentiometers 40 and 52 had maximum values of about 210 kilohms, trimming resistors 74 and 76 were variable resistors having a maximum value of about 100 kilohms, resistor 22 was one megohm and capacitor 24 had a value of four microfarads. It should be noted that by making the resistance of resistors 22 and the associated trimming resistor high as compared to the potentiometer resistance, undesirable loading effects upon the selected generator 36 or 48 are avoided. In actual practice potentiometers 40 and 52 differ only slightly in their settings if generators 36 and 48 are reasonably matched to each other.

While the above disclosure and the accompanying drawings have specifically disclosed and shown only two variables being compared, for the sake of clarity, further signal sources may be added as desired by duplicating the disclosed circuit configuration. Furthermore, the invention is not limited to comparison of angular velocities of shafts or of the use of D.C. generators to produce the numerator signal on conductor 46. Similarly, the denominator signal may be produced by other than the illustrated electromechanical switch by methods well known to those skilled in the art. It is noted that if the load 29 responds to the peak voltage across capacitor 24 rather than to the average voltage as above described, the trimming resistors 74 and 76 would be adjusted to produce identical peak voltages on terminal 28 at identical repetition rates of switches 60 and 64.

Accordingly, there has been disclosed simple and efficient circuitry for determining the ratio between two selected quantities. In its more specific aspects, there has been disclosed apparatus for comparing angular velocities of two or more rotating members. The potentiometers 40 and 52, connected across the output terminals of signal generators 36 and 48, respectively, permit compensation among the transducers which provide the numerator signal. Trimming resistors 74 and 76 permit efficient compensation for differences in dwell angle of the discharge mechanisms illustrated as switches 60 and 64. Maintaining the total resistance between the numerator conductor 46 and the output conductor 28 high in comparison with the potentiometer resistance reduces the "loading" effect on generators 36 and 48.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is:

1. A signal analyzer comprising in combination:
 (a) a time constant circuit including a resistance and a capacitance connected in series between first and second terminals,
 (b) a plurality of direct current signal sources, each said source having one terminal connected to said second terminal and having a remaining terminal,
 (c) a numerator selector switch for connecting said remaining terminal of a selected one of said sources to a numerator terminal,
 (d) a plurality of discharging switch means actuated at repetition rates proportional to corresponding variables,
 (e) denominator selector switch means for connecting a selected one of said discharging switch means in parallel with said capacitor and for connecting said numerator terminal to said first terminal,
 (f) and output means connected in parallel with said capacitor.

2. A signal analyzer comprising in combination:
(a) a time constant circuit including a resistance and a capacitance connected in series between first and second terminals,
(b) a plurality of direct current signal sources, each said source having one terminal connected to said second terminal and having a remaining terminal,
(c) a plurality of discharging switch means actuated at repetition rates proportional to corresponding variables,
(d) selector switch means for connecting a selected one of said discharging switch means in parallel with said capacitor and for connecting said remaining terminal of a selected signal source to said first terminal,
(e) and output means connected in parallel with said capacitor.

3. A signal analyzer comprising in combination:
(a) a resistance and a capacitance connected in series between first and second terminals,
(b) a plurality of direct current signal sources, each said source having one terminal connected to said second terminnal and having a remaining terminal,
(c) a plurality of switching mechanisms periodically actuated at repetition rates proportional to a corresponding plurality of variables,
(d) a trimming impedance corresponding to each switching mechanism,
(e) selector switch means for:
(1) connecting a selected one of said switching mechanisms in parallel with said capacitor, and
(2) connecting said remaining terminal of one of said sources in series with the corresponding trimming impedance to said first and second terminals,
(f) said trimming impedances being proportioned to compensate for variations among said switching mechanisms,
(g) and output means connected across said capacitor.

4. A signal analyzer comprising in combination:
(a) a resistance and a capacitance connected in series between first and second terminals,
(b) a plurality of direct current signal sources, each said source:
(1) having one of its output terminals connected to one of said first and second terminals, and
(2) having a potentiometer connected across its output terminals,
(c) each said potentiometer having a tap connected to an intermediate point thereon,
(d) a plurality of switching mechanisms periodically actuated at repetition rates proportional to corresponding variables,
(e) selector switch means for:
(1) connecting a selected one of said switching mechanisms in parallel with said capacitor, and
(2) connecting a selected tap to the other of said first and second terminals,
(f) and output means connected across said capacitor.

5. A signal analyzer comprising in combination:
(a) a resistance and a capacitance connected in series between first and second terminals,
(b) a plurality of direct current signal sources, each said source:
(1) having one of its output terminals connected to one of said first and second terminals, and
(2) having a potentiometer connected across its output terminals,
(c) each said potentiometer having a tap connected to an intermediate point thereon,
(d) a plurality of switching mechanisms periodically actuated at repetition rates proportional to corresponding variables,
(e) a trimming impedance corresponding to each switching mechanism,
(f) selector switch means for:
(1) connecting a selected one of said switching mechanisms in parallel with said capacitor, and
(2) connecting a selected tap through the corresponding trimming impedance to the other of said first and second terminals,
(g) said trimming impedances being proportioned to compensate for variations among said switching mechanisms,
(h) and output means connected across said capacitor.

6. The signal analyzer defined in claim 5 wherein the combined impedance of each said trimming impedance and said resistance is at least 10 times greater than the impedance between each said tap and the other of the output terminals of the associated signal source.

7. A signal analyzer comprising in combination:
(a) a resistance and a capacitance connected in series between first and second terminals,
(b) a plurality of direct current signal sources, each said source:
(1) having one of its output terminals connected to one of said first and second terminals, and
(2) having a potentiometer connected across its output terminals,
(c) each said potentiometer having a tap connected to an intermediate point thereof,
(d) a numerator selector switch for connecting a selected one of said sources to a numerator terminal,
(e) a switching mechanism periodically actuated at a repetition rate proportional to the output of each of said signal sources,
(f) a trimming impedance corresponding to each switching mechanism,
(g) selector switch means for:
(1) connecting a selected one of said switching mechanisms in parallel with said capacitor, and
(2) connecting said numerator terminal through the corresponding trimming impedance to the other of said first and second terminals,
(h) said trimming impedances being proportioned to compensate for variations among said switching mechanisms,
(i) and output means connected across said capacitor.

8. The signal analyzer defined in claim 7 wherein the combined impedance of each said trimming impedance and said resistance is at least 10 times greater than the impedance between each said tap and the other of the output terminals of the associated signal source.

References Cited
UNITED STATES PATENTS

| | | | |
|---|---|---|---|
| 2,977,536 | 3/1961 | Hindel | 320—1 X |
| 2,999,968 | 3/1961 | Weiss | 320—1 |

BERNARD KONICK, *Primary Examinner.*

TERRELL W. FEARS, *Examiner.*

L. H. HILL, *Assistant Examiner.*

UNITED STATES PATENT OFFICE
CERTIFICATE OF CORRECTION

Patent No. 3,354,390                      November 21, 1967

John M. Green et al.

It is hereby certified that error appears in the above numbered patent requiring correction and that the said Letters Patent should read as corrected below.

Column 3, line 32, after "closed," insert -- enabling cam-actuated switch 64 rather than switch 60, the --.

Signed and sealed this 6th day of May 1969.

(SEAL)
Attest:

Edward M. Fletcher, Jr.
Attesting Officer

Commissioner of Patents